US012693119B2

(12) United States Patent
Moriguchi

(10) Patent No.: US 12,693,119 B2
(45) Date of Patent: *Jul. 28, 2026

(54) VIBRATION-TYPE ANGULAR RATE SENSOR

(71) Applicant: Sumitomo Precision Products Co., Ltd., Amagasaki (JP)

(72) Inventor: Takafumi Moriguchi, Amagasaki (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 277 days.

This patent is subject to a terminal disclaimer.

(21) Appl. No.: 18/691,257

(22) PCT Filed: Sep. 13, 2021

(86) PCT No.: PCT/JP2021/033607
§ 371 (c)(1),
(2) Date: Mar. 12, 2024

(87) PCT Pub. No.: WO2023/037559
PCT Pub. Date: Mar. 16, 2023

(65) Prior Publication Data
US 2024/0384990 A1 Nov. 21, 2024

(51) Int. Cl.
*G01C 19/5776* (2012.01)

(52) U.S. Cl.
CPC ................................. *G01C 19/5776* (2013.01)

(58) Field of Classification Search
CPC ................................................ G01C 19/5776
See application file for complete search history.

(56) References Cited

U.S. PATENT DOCUMENTS

| | | | | |
|---|---|---|---|---|
| 4,587,860 A | * | 5/1986 | Audren | G01C 19/24 74/5.6 D |
| 10,161,751 B2 | | 12/2018 | Moriguchi | |
| 12,281,895 B2 | * | 4/2025 | Moriguchi | G01C 19/567 |
| 2016/0377433 A1 | * | 12/2016 | Moriguchi | G01C 19/5677 73/504.12 |

FOREIGN PATENT DOCUMENTS

| | | |
|---|---|---|
| EP | 3 112 804 A1 | 1/2017 |
| JP | 2009-115559 A | 5/2009 |
| JP | 6463335 B2 | 1/2019 |

OTHER PUBLICATIONS

International Search Report (PCT/ISA/210) issued in PCT Application No. PCT/JP2021/033607 dated Nov. 9, 2021 with English translation (4 pages).
Japanese-language Written Opinion (PCT/ISA/237) issued in PCT Application No. PCT/JP2021/033607 dated Nov. 9, 2021 with English translation (6 pages).

* cited by examiner

*Primary Examiner* — John E Breene
*Assistant Examiner* — Alex T Devito
(74) *Attorney, Agent, or Firm* — Crowell & Moring LLP

(57) ABSTRACT

A vibration-type angular rate sensor (100) according to this invention is configured to switch between one set of electrodes (50) and another set of electrodes (50) as electrodes that induce the primary vibration in the vibrator (1), and to switch between the another set of electrodes and the one set of electrodes as electrodes that detect the secondary vibration in the vibrator (1), and the offset value after the switching and the offset value before the switching are symmetrical values with respect to a predetermined reference value.

9 Claims, 6 Drawing Sheets

FIRST EMBODIMENT

*FIG.4*
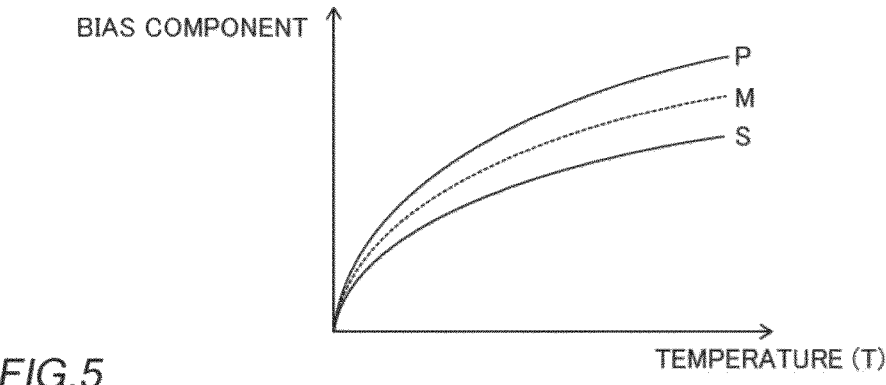
*FIG.5*
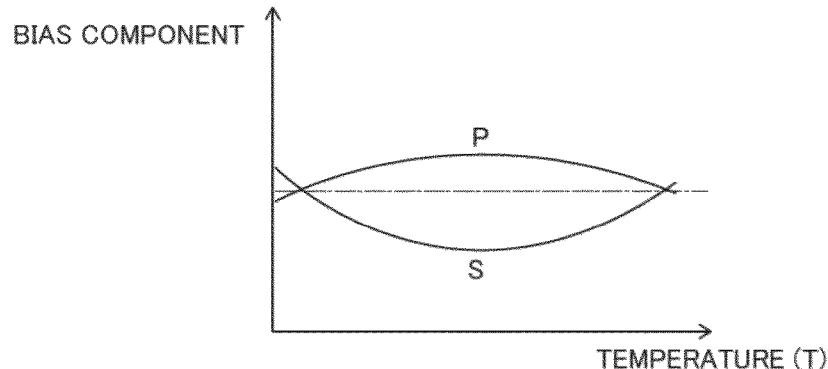
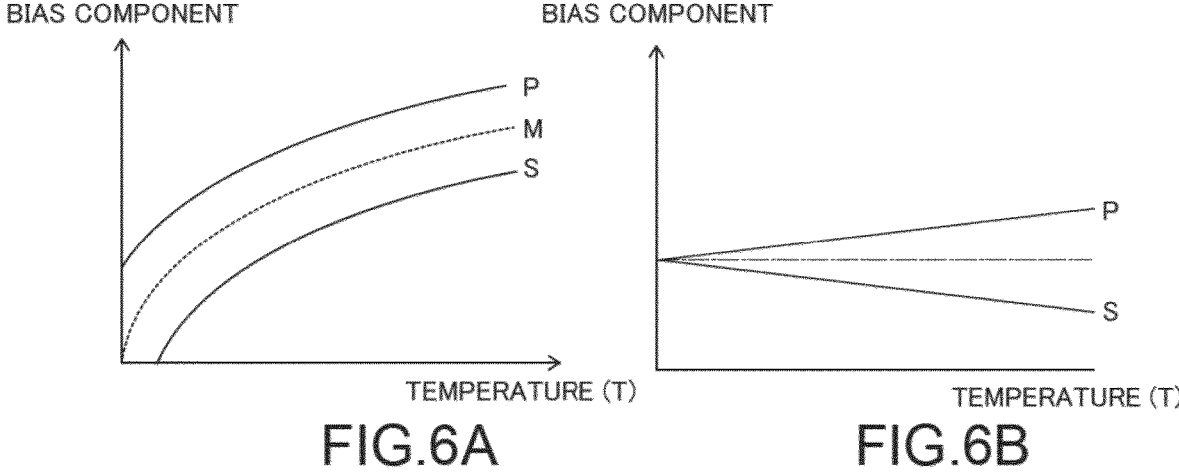
FIG.6A        FIG.6B

*FIG.9*

| TEMPERATURE (T) | T1 | T2 | ⋯ |
|---|---|---|---|
| OFFSET VALUE (y) | y1 | y2 | ⋯ |
| OFFSET VALUE (z) | z1 | z2 | ⋯ |
| OUTPUT OF PRIM. CONTROL CKT (x) | x1 | x2 | ⋯ |

VIBRATION-TYPE ANGULAR RATE SENSOR

TECHNICAL FIELD

The present invention relates to a vibration-type angular rate sensor, in particular to a vibration-type angular rate sensor including a primary-side control circuit that induces a primary vibration in a vibrator and a secondary-side control circuit that detects and outputs a secondary vibration generated in the vibrator due to an angular velocity applied to the vibrator.

BACKGROUND ART

Vibration-type angular rate sensors are known in the art. Such vibration-type angular rate sensors are disclosed, for example, in Japanese Patent Laid-Open Publication No. JP 2009-115559 and Japanese Patent Publication No. JP 6463335.

In Japanese Patent Laid-Open Publication No. JP 2009-115559, a ring-shaped element, and a plurality of electrodes circumferentially arranged in a radially outside part are provided. The plurality of electrodes include primary and secondary electrodes. Alternating current sources are connected to one of the primary electrode set and the secondary electrode set to apply alternating voltage to the one of the primary electrode set and the secondary electrode set so as to generate primary vibration in the ring-shaped element. The other side of the primary electrode and the secondary electrode is connected to a detector that detects the magnitude of the electrical signal generated in the ring-shaped element. With the primary vibration being generated in the ring-shaped element, when rotational motion is generated about a direction normal to the element, secondary vibration is then generated in the element in accordance with the angular velocity of the rotational motion. Subsequently, detectors connected to another of the primary electrode set and the secondary electrode set detect magnitudes of electrical signals that are generated in the another of the primary electrode set and the secondary electrode set due to the secondary vibration. Also, an alternating voltage is applied to one of the primary electrode set and the secondary electrode set based on the magnitudes of the detected electrical signals to counteract the secondary vibration. In addition, a magnitude of the angular velocity is calculated based on a magnitude of the alternating voltage, which is applied to counteract the secondary vibration.

In the known vibration-type angular rate sensor disclosed in Japanese Patent Laid-Open Publication No. JP 2009-115559, the angular velocity detected by the vibration-type angular rate sensor includes a bias component (error with respect to a zero point output from the sensor even when the angular velocity is not applied). The bias component is caused by asymmetry of a gyro element included in the vibration-type angular rate sensor. For this reason, the known vibration-type angular rate sensor disclosed in Japanese Patent Laid-Open Publication No. JP 2009-115559 is configured to switch between electrodes to which an alternating current source is connected (one of the primary electrode set and the secondary electrode set) and electrodes to which detectors are connected (another of the primary electrode set and the secondary electrode set). The bias component is canceled by acquiring a difference between outputs of the vibration-type angular rate sensor before and after the switching.

In the vibration-type angular rate sensor disclosed in Japanese Patent Laid-Open Publication No. JP 2009-115559, which is configured to switch between electrodes to which alternating current sources are connected and electrodes to which detectors are connected so as to cancel the bias component, a residual bias component that cannot be completely canceled appears in some cases. In such a case, the residual bias component varies depending on a surrounding environmental temperature.

Japanese Patent Publication No. JP 6463335 discloses a vibration-type angular rate sensor including a primary-side control circuit that induces a primary vibration in a vibrator and a secondary-side control circuit that detects and outputs a secondary vibration generated in the vibrator due to an angular velocity applied to the vibrator. In this vibration-type angular rate sensor, the primary-side control circuit and the secondary-side control circuit include a closed control loop. In addition, a first offset value based on an output of the primary-side control circuit that is inversely proportional to a temperature change of a gain of the vibrator, and a second offset value based on a constant signal that is independent of temperature are added to the closed control loop of the secondary-side control circuit. Accordingly, an error by cross talk from the primary-side control circuit to the secondary-side control circuit (error inversely proportional to the first power and the second power of the gain of the vibrator) can be reduced. The first and second offset values are adjusted to reduce the error caused by the crosstalk from the primary-side control circuit to the secondary-side control circuit. As a result, the sensor output from the secondary-side control circuit is corrected. Consequently, temperature variation of the output from the vibration-type angular rate sensor (variation of output value caused by surrounding temperature) can be reduced.

From these viewpoints, the residual bias component, which varies depending on a surrounding environmental temperature, can be reduced by applying a configuration of Japanese Patent Publication No. JP 6463335 to the vibration-type angular rate sensor disclosed in Japanese Patent Laid-Open Publication No. JP 2009-115559, which is configured to switch between electrodes to which alternating current sources are connected and electrodes to which detectors are connected so as to cancel the bias component, before and after the switching.

PRIOR ART

Patent Document

Patent Document 1: Japanese Patent Laid-Open Publication No. JP 2009-115559
Patent Document 2: Japanese Patent Publication No. JP 6463335

SUMMARY OF THE INVENTION

Problems to be Solved by the Invention

However, to cancel the bias component by switching between electrodes to which an alternating current source is connected and electrodes to which detectors as disclosed in Japanese Patent Laid-Open Publication No. JP 2009-115559, symmetry of control of the vibration-type angular rate sensor before and after the switching is important. Here, in a case in which the configuration of Japanese Patent Publication No. JP 6463335 is applied before and after the switching so that the first and second offset values individually are set before and after the switching, the first and second offset values before and after the switching are not generally symmetrical. For this reason, if asymmetrical first and second offset values are set before and after the switching, symmetry of control of the vibration-type angular rate sensor is broken, and as a result a temperature variation component of the residual bias that cannot be completely canceled will be increased.

The present invention is intended to solve the above problem, and one object of the present invention is to provide vibration-type angular rate sensor capable of preventing increase of a temperature variation component of residual bias that cannot be completely canceled.

Means for Solving the Problems

In order to attain the aforementioned object, a vibration-type angular rate sensor according to a first aspect of the present invention includes a vibrator; a primary-side control circuit including a closed control loop and configured to induce a primary vibration in the vibrator by using an output of the closed control loop; and a secondary-side control circuit including a closed control loop that is configured to detect a secondary vibration generated in the vibrator due to an angular velocity applied to the vibrator, and configured to correct a sensor output by adding an offset value to the closed control loop, wherein the primary-side control circuit is configured to switch between one set of electrodes and another set of electrodes as electrodes that induce the primary vibration in the vibrator, the secondary-side control circuit is configured to switch between the another set of electrodes and the one set of electrodes as electrodes that detect the secondary vibration in the vibrator, and the offset value after the switching and the offset value before the switching are symmetrical values with respect to a predetermined reference value.

In the vibration-type angular rate sensor according to the first aspect of the present invention, as discussed above, the primary-side control circuit is configured to switch between one set of electrodes and another set of electrodes as electrodes that induce the primary vibration in the vibrator, the secondary-side control circuit is configured to switch between the another set of electrodes and the one set of electrodes as electrodes that detect the secondary vibration in the vibrator, and the offset value after the switching and the offset value before the switching are symmetrical values with respect to a predetermined reference value. According to this configuration, because the offset values before and after the switching are symmetrical values with respect to a predetermined reference value, it is possible to prevent that symmetry of control of the vibration-type angular rate sensor before and after the switching is broken. Consequently, it is possible to preventing increase of a temperature variation component of residual bias that cannot be completely canceled.

In the vibration-type angular rate sensor according to the aforementioned first aspect, it is preferable that the secondary-side control circuit includes a loop filter in the closed control loop, and that the sensor output is corrected by adding the offset value to an input of the loop filter. Here, the output of the closed control loop corresponds to an output of the loop filter. The output of the loop filter is inversely proportional to the gain of the vibrator dependent on temperature by the feedback operation of the closed control loop. In the present invention, from this viewpoint, an error caused by crosstalk that is inversely proportional to the first power and/or the second power of the gain of the vibrator, can be reduced by adding the offset value to the input of the loop filter.

In the vibration-type angular rate sensor according to the aforementioned first aspect, it is preferable that the offset value after the switching is −a, which is a value whose polarity is inverted from the offset value before the switching a. According to this configuration, because the offset values before and after the switching are symmetrical values with respect to zero, it is possible to prevent that symmetry of control of the vibration-type angular rate sensor before and after the switching is broken.

In the vibration-type angular rate sensor according to the aforementioned first aspect, it is preferable that the offset value before the switching is a+b, and the offset value after the switching is −a+b where a is a temporary offset value before the switching, −a is a temporary offset value after the switching, and b is a temporary offset value that is offset with respect to a median between the sensor output before the switching and the sensor output after the switching. According to this configuration, because the offset values before and after the switching are symmetrical values with respect to b, it is possible to prevent that symmetry of control of the vibration-type angular rate sensor before and after the switching is broken. Also, because the offset values before and after the switching are symmetrical with the offset value b with respect to the median between the sensor output before the switching and the sensor output after the switching, it is possible to prevent that symmetry of control of the vibration-type angular rate sensor before and after the switching is broken while reducing a gradient of a residual bias component with respect to an environment temperature. The term "temporary" refers to an offset value in an intermediate stage before a final offset value is acquired.

In the vibration-type angular rate sensor according to the aforementioned first aspect, it is preferable that the sensor output is corrected, in a case of analog correction of the sensor output, by adding, to the closed control loop of the secondary-side control circuit, a first offset value based on the output of the primary-side control circuit that is inversely proportional to a temperature-dependent gain of the vibrator for correction of the sensor output that is inversely proportional to a second power of a temperature-dependent gain of the vibrator from the secondary-side control circuit, and a second offset value based on a constant signal that is independent of temperature for correction of the sensor output that is inversely proportional to the temperature-dependent gain of the vibrator from the secondary-side control circuit, and by adjusting addition amounts of the first offset value and the second offset value. When the second offset value based on the constant signal not dependent on temperature is added to the closed control loop of the secondary-side control circuit, the output of the secondary-side control circuit has properties inversely proportional to the gain of the vibrator dependent on temperature. Similarly, the output of the primary-side control circuit also has properties inversely proportional to the gain of the vibrator by the feedback operation of the closed control loop, and hence the output of the secondary-side control circuit has properties inversely proportional to the second power of the gain of the vibrator by adding, to the closed control loop of the secondary-side control circuit, the first offset value based on the output of the primary-side control circuit having the properties inversely proportional to the gain of the vibrator. In other words, because the sensor output is corrected, by adding, a first offset value corresponding to a second power of the gain of the vibrator and a second offset value corresponding to the gain of the vibrator, and by adjusting addition amounts of the first offset value and the second offset value, the sensor output can be subjected to correction that is inversely proportional to a first power of the gain of the vibrator and correction that is inversely proportional to a second power of the gain of the vibrator.

In this configuration, it is preferable that the analog correction is applied to the sensor output by adjusting the addition amount of the first offset value based on the output of the primary-side control circuit, which is dependent on temperature and is inversely proportional to the temperature-dependent gain of the vibrator, so as to reduce $A/GR^2(T)$, and by adjusting the addition amount of the second offset value based on the constant signal that is independent of temperature so as to reduce $B/G_R(T)$; and $A/GR^2(T)$ and $B/G_R(T)$ are first and second terms, respectively, of the following equation representing a total error $V_{Out\_Total\_Error}$ of an error of the sensor output that occurs in the closed control loop of the secondary-side control circuit due to an error signal that occurs from a circuit block included in the secondary-side control circuit and an error of the sensor output that occurs in the closed control loop of the secondary-side control circuit due to cross talk from the primary-side control circuit to the secondary-side control circuit. In the following equation, where $G_R(T)$ is the gain of the vibrator, which is dependent on temperature of the vibrator, and A, B, and C are constant values independent of temperature. According to this configuration, both the primary (the first power of the gain of the vibrator) component and the secondary (the second power of the gain of the vibrator) component of the error in the sensor output can be reduced, and hence the accuracy of the correction can be reliably increased. Although a constant value C remains, C is a constant value not dependent on temperature; hence the error in the sensor output caused by a temperature change is not influenced; and thus, no problem occurs in the correction.

$$V_{Out\_Total\_Error} = A \cdot \frac{1}{G_R^2(T)} + B \cdot \frac{1}{G_R(T)} + C \qquad \text{[Equation 2]}$$

In the vibration-type angular rate sensor according to the aforementioned first aspect, it is preferable that the sensor output is corrected, in a case of digital correction of the sensor output, by quantizing the output of the primary-side control circuit, which is dependent on temperature and is inversely proportional to the temperature-dependent gain of the vibrator, and by adding, to the secondary-side control circuit, the offset value for reducing an error in the sensor output caused by a temperature change in accordance with the quantized output of the primary-side control circuit. According to this configuration, the sensor output can be corrected simply by adding, to the secondary-side control circuit, the offset value for reducing the error in the sensor output caused by a temperature change to zero or substantially zero, and hence the configuration of the vibration-type angular rate sensor can be simplified, unlike the case where an offset value other than the offset value based on the output of the primary-side control circuit dependent on temperature is added.

In the vibration-type angular rate sensor according to the aforementioned first aspect, it is preferable that the vibrator includes a ring-shaped vibrator. The ring-type vibrator has a symmetrical shape, and hence a vibration mode in the primary-side control circuit and a vibration mode in the secondary-side control circuit are similar to each other. Thus, when the present invention is applied to the vibration-type angular rate sensor including the ring-type vibrator, it is not necessary to take into account the influence of a difference between the vibration modes, and hence the sensor output can be easily corrected.

In the vibration-type angular rate sensor according to the aforementioned first aspect, it is preferable that the primary-side control circuit includes a first switch provided to an input side of a signal to the vibrator, and a second switch provided to an output side of a signal from the vibrator; that the secondary-side control circuit includes a third switch provided to the input side of a signal to the vibrator, and a fourth switch provided to the output side of the signal from the vibrator; that the primary-side control circuit is configured to switch between the one set of electrodes and the another set of electrodes as the electrodes that induce the primary vibration in the vibrator by switching the first switch and the second switch; and that the secondary-side control circuit is configured to switch between the another set of electrodes and the one set of electrodes as the electrodes that detect the secondary vibration in the vibrator by switching the third switch and the fourth switch. According to this configuration, the switching of the first to fourth switches allows the primary-side control circuit to easily switch between one set of electrodes and another set of electrodes as electrodes that induce the primary vibration in the vibrator, and the secondary-side control circuit to easily switch between the another set of electrodes and the one set of electrodes as electrodes that detect the secondary vibration in the vibrator.

Effect of the Invention

According to the present invention, as discussed above, it is possible to preventing increase of a temperature variation component of residual bias that cannot be completely canceled.

BRIEF DESCRIPTION OF THE DRAWINGS

FIG. 4 is a graph illustrating relationship between a temperature and a bias component.

FIG. 5 is a graph (1) illustrating relationship between a temperature and a bias component after correction of the sensor output by using an offset value.

FIG. 6A is a graph (2) illustrating relationship between a temperature and a bias component after correction of the sensor output by using an offset value. FIG. 6B is a-graph (3) illustrating relationship between a temperature and a bias component after correction of the sensor output by using an offset value.

FIG. 9 is a table illustrating correction of a sensor output in the vibration-type angular rate sensor according to the second embodiment.

MODES FOR CARRYING OUT THE INVENTION

Embodiments according the present invention will be described with reference to the drawings.

First Embodiment

Figure 1:
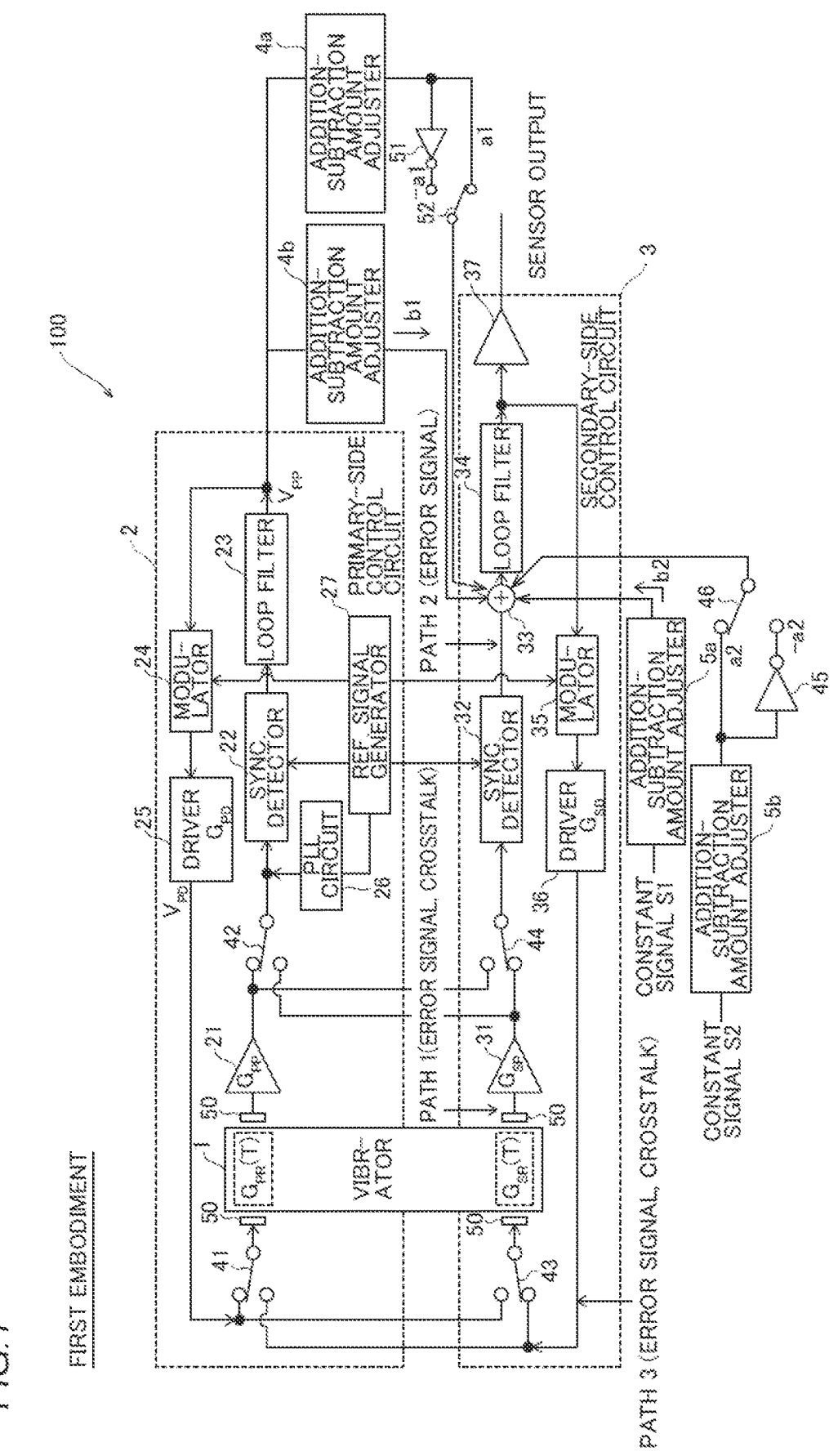
FIG. 1 is a block diagram showing a configuration of a vibration-type angular rate sensor according to a first embodiment.

The following description describes a configuration of a vibration-type angular rate sensor 100 according to a first embodiment with reference to FIG. 1. In this first embodiment, exemplary correction is described by applying analog processing to a sensor output of the vibration-type angular rate sensor 100.

As shown in FIG. 1, the vibration-type angular rate sensor 100 includes a vibrator 1, a primary-side control circuit 2 including a closed control loop configured to drive the vibrator 1, and a secondary-side control circuit 3 including a closed control loop configured to detect and output secondary vibration when the angular velocity is applied to the vibrator 1 driven by the primary-side control circuit 2. Here, in the first embodiment, the vibrator 1 includes a ring-type vibrator 1.

The primary-side control circuit 2 includes an amplifier circuit 21, a synchronous detection circuit 22, a loop filter 23, a modulation circuit 24, a drive circuit 25, a PLL (phase locked loop) circuit (phase synchronization circuit) 26, and a reference signal generation circuit 27. The vibrator 1, the amplifier circuit 21, the synchronous detection circuit 22, the loop filter 23, the modulation circuit 24, and the drive circuit 25 are connected to each other in this order, and constitute the closed control loop. The loop filter 23 includes an integral filter, for example. The loop filter 23 is an example of a "primary-side loop filter" in the claims.

The secondary-side control circuit 3 includes an amplifier circuit 31, a synchronous detection circuit 32, an adder circuit 33, a loop filter 34, a modulation circuit 35, a drive circuit 36, and an amplifier circuit 37. The vibrator 1, the amplifier circuit 31, the synchronous detection circuit 32, the adder circuit 33, the loop filter 34, the modulation circuit 35, and the drive circuit 36 are connected to each other in this order, and constitute the closed control loop. The adder circuit 33 includes a common adder and subtracter using an operational amplifier. The loop filter 34 includes an integral filter, for example. An output of the loop filter 34 is input into the amplifier circuit 37. A signal output from the amplifier circuit 37 is output as a sensor output of the vibration-type angular rate sensor 100 to an external portion.

In the vibration-type angular rate sensor 100 according to the first embodiment, the primary-side control circuit 2 is configured to switch between one set of electrodes 50 and another set of electrodes 50 as electrodes that induce the primary vibration in the vibrator 1, and the secondary-side control circuit 3 is configured to switch between the another set of electrodes and the one set of electrodes as electrodes that detect the secondary vibration in the vibrator 1. Specifically, the primary-side control circuit 2 includes a switch 41 that is provided to the input side of a signal to the vibrator 1, and a switch 42 that is provided to the output side of a signal (output side of amplification circuit 21) from the vibrator 1. Also, the secondary-side control circuit 3 includes a switch 43 that is provided to the input side of a signal to the vibrator 1, and a switch 44 that is provided to the output side of the signal (output side of amplification circuit 31) from the vibrator 1. FIG. 1 is a block diagram illustrating a connection state in which the switch 41 and the switch 42 connect the electrode 50 that are located in an upper side of the vibrator 1 to the primary-side control circuit 2, and the switch 43 and the switch 44 connect the electrode 50 that are located in a lower side of the vibrator 1 to the secondary-side control circuit 3. Here, the terms "upper side" and "lower side" are used as an "upper side" and a "lower side" only for ease of illustration of FIG. 1, and are not refer to an actual "upper side" and an actual "lower side" of the vibrator 1. The switch 41 and the switch 42 are an example of a "first switch" and an example of a "second switch" in the claims, respectively. The switch 43 and the switch 44 are an example of a "third switch" and an example of a "fourth switch" in the claims, respectively.

In the first embodiment, the primary-side control circuit 2 is configured to switch between the one set of electrodes 50 and the another set of electrodes 50 as the electrodes that induce the primary vibration in the vibrator 1 by switching the switch 41 and the switch 42. Also, the secondary-side control circuit 3 is configured to switch between the another set of electrodes 50 and the one set of electrodes 50 as the electrodes that detect the secondary vibration in the vibrator 1 by switching the switch 43 and the switch 44. Specifically, the connection state as shown in FIG. 1 in which the switch 41 and the switch 42 connect the electrode 50 that are located in the upper side of the vibrator 1 to the primary-side control circuit 2, and the switch 43 and the switch 44 connect the electrode 50 that are located in the lower side of the vibrator 1 to the secondary-side control circuit 3 is changed to a connection state in which the switch 41 and the switch 42 connect the electrode 50 that are located in the upper side of the vibrator 1 to the secondary-side control circuit 3, and the switch 43 and the switch 44 connect the electrode 50 that are located in the lower side of the vibrator 1 to the primary-side control circuit 2. Accordingly, the primary-side control circuit 2 can switch between one set of electrodes 50 and another set of electrodes 50 as electrodes that induce the primary vibration in the vibrator 1, and the secondary-side control circuit 3 can switch between the another set of electrodes and the one set of electrodes as electrodes that detect the secondary vibration in the vibrator 1. Here, the terms "upper side" and "lower side" are used as an "upper side" and a "lower side" only for ease of illustration of FIG. 1, and are not refer to an actual "upper side" and an actual "lower side" of the vibrator 1.

The vibration-type angular rate sensor 100 is provided with addition-subtraction amount adjusting circuits 4a and 4b into which an output from the primary-side control circuit 2 (an output from the loop filter 23) is input. The addition-subtraction amount adjusting circuits 4a and 4b are configured to adjust the magnitude of the output of the loop filter 23 of the primary-side control circuit 2 dependent on temperature and input the adjusted output (temporary first offset value) into the adder circuit 33 of the secondary-side control circuit 3. For example, the addition-subtraction amount adjusting circuits 4a and 4b adjust the addition amount of the temporary first offset value by dividing a voltage with a potentiometer (volume resistance) or the like.

The vibration-type angular rate sensor 100 is provided with an addition-subtraction amount adjusting circuit 5a into which a constant signal S1 not dependent on temperature is input. The addition-subtraction amount adjusting circuit 5a is configured to adjust the magnitude of the constant signal S1 and input the adjusted constant signal S1 (temporary second offset value) into the adder circuit 33 of the secondary-side control circuit 3. For example, the addition-subtraction amount adjusting circuit 5a adjusts the addition amount of the constant signal S1 by dividing a voltage with a potentiometer (volume resistance) or the like.

The vibration-type angular rate sensor 100 is provided with an addition-subtraction amount adjusting circuit 5b into which a constant signal S2 not dependent on temperature is input. The addition-subtraction amount adjusting circuit 5b is configured to adjust the magnitude of the constant signal S2 and input the adjusted constant signal S2 (temporary second offset value) into the adder circuit 33 of the secondary-side control circuit 3. For example, the addition-subtraction amount adjusting circuit 5b adjusts the addition amount of the constant signal S2 by dividing a voltage with a potentiometer (volume resistance) or the like.

Here, in the first embodiment, the sensor output (output from secondary-side control circuit 3) is corrected, in a case of analog correction of the sensor output, by adding, to the closed control loop of the secondary-side control circuit 3 (input of loop filter 34 of secondary-side control circuit 3), a first offset value based on the output of the primary-side control circuit 2 (output of loop filter 23), which is inversely proportional to the temperature-dependent gain of the vibrator 1 for correction of the sensor output from the secondary-side control circuit 3 that is inversely proportional to a second power of the temperature-dependent gain of the vibrator 1, and a second offset value based on a constant signal that is independent of temperature for correction of the sensor output from the secondary-side control circuit 3 that is inversely proportional to the temperature-dependent gain of the vibrator 1, and by adjusting addition amounts of the first offset value and the second offset value by using the addition-subtraction amount adjusting circuits 4a and 4b, and the addition-subtraction amount adjusting circuits 5a and 5b, respectively. The first offset value and the second offset value are determined to reduce an error of the sensor output that occurs in the closed control loop of the secondary-side control circuit 3 due to an error signal that occurs from a circuit block included in the secondary-side control circuit 3, and an error of the sensor output that occurs in the closed control loop of the secondary-side control circuit 3 due to cross talk (signal interference) from the primary-side control circuit 2 to the secondary-side control circuit 3, and added to the closed control loop of the secondary-side control circuit for correction of the sensor output.

In the first embodiment, the offset values after the switching (first and second offset values) and offset values before the switching are symmetrical values with respect to a predetermined reference value. In other words, an absolute value of difference between the offset value added to the closed control loop before the switching and the predetermined reference value is substantially equal to an absolute value of difference between the offset value added to the closed control loop after before the switching and the predetermined reference value.

Specifically, in the first embodiment, the offset value before the switching is a+b, and the offset value after the switching is −a+b where a is a temporary offset value before the switching, −a is a temporary offset value after the switching, and b is a temporary offset value that is offset with respect to a median between the sensor output before the switching and the sensor output after the switching. The temporal offset value a corresponds a temporal first offset value a1, and a temporal second offset value a2, which will be described later. The temporal offset value b corresponds a temporal first offset value b1, and a temporal second offset value b2, which will be described later. The temporary offset value b with respect to the median is an example of a "predetermined reference value" in the claims.

Specifically, the addition-subtraction amount adjusting circuit 4a and the addition-subtraction amount adjusting circuit 4b are connected to the output side of the primary-side control circuit 2 as shown in FIG. 1. An inverting circuit 51 and a switch 52 are provided to the output side of the addition-subtraction amount adjusting circuit 4a. The switch 52 is configured to switch between a connection state in which the switch is connected to the addition-subtraction amount adjusting circuit 4a, and a connection state in which the switch is connected to the inverting circuit 51. In the connection state in which the switch 52 is connected to the addition-subtraction amount adjusting circuit 4a as shown in FIG. 1, an output (a1) from the addition-subtraction amount adjusting circuit 4a, and an output (b1) from the addition-subtraction amount adjusting circuit 4b are input to the adder circuit 33. In other words, a1+b1 is added as the first offset value to the secondary-side control circuit 3. In the connection state in which the switch 52 is connected to the inverting circuit 51, an output (−a1) from the inverting circuit 51, and an output (b1) from the addition-subtraction amount adjusting circuit 4b are input to the adder circuit 33. In other words, −a1+b1 is added as the first offset value to the secondary-side control circuit 3. Calculation for acquiring a1 and b1 will be described later.

An inverting circuit 45 and a switch 46 are provided to the output side of the addition-subtraction amount adjusting circuit 5b. The switch 46 is configured to switch between a connection state in which the switch is connected to the addition-subtraction amount adjusting circuit 5b, and a connection state in which the switch is connected to the inverting circuit 45. In the connection state in which the switch 46 is connected to the addition-subtraction amount adjusting circuit 5b as shown in FIG. 1, an output (a2) from the addition-subtraction amount adjusting circuit 5b, and an output (b2) from the addition-subtraction amount adjusting circuit 5a are input to the adder circuit 33. In other words, a2+b2 is added as the second offset value to the secondary-side control circuit 3. In the connection state in which the switch 46 is connected to the inverting circuit 45, an output (−a2) from the inverting circuit 45, and the an output (b2) from the addition-subtraction amount adjusting circuit 5a are input to the adder circuit 33. In other words, −a2+b2 is added as the second offset value to the secondary-side control circuit 3. Calculation for acquiring a2 and b2 will be described later.

(Configuration without Switching)

The following description describes correction of the sensor output of the vibration-type angular rate sensor 100 with reference to FIG. 1. The following describes a configuration in which the primary-side control circuit 2 does not switch between one set of electrodes 50 and another set of electrodes 50 as electrodes that induce the primary vibration in the vibrator 1, and the secondary-side control circuit 3 does not switch between the another set of electrodes and the one set of electrodes as electrodes that detect the secondary vibration in the vibrator 1 (in other words, a configuration of Japanese Patent Publication No. JP 6463335).

An error in the output of the vibration-type angular rate sensor 100, which is a subject to be corrected, is first described. As the error in the output of the vibration-type angular rate sensor 100, the error in the sensor output of the vibration-type angular rate sensor 100 caused by the error signal generated from the circuit block constituting the secondary-side control circuit 3 and the error in the sensor output of the vibration-type angular rate sensor 100 caused by an influence (cross talk) from the primary-side control circuit 2 exist. Assume that a component (error component) of the error signal generated from the circuit block constituting the secondary-side control circuit 3 is a constant value, which is not dependent on temperature. In general, in a feedback circuit, an output signal from each circuit is represented by a value obtained by dividing an input signal input into each circuit by a feedback gain ((output signal)= (input signal)×1/(feedback gain)).

As stated in Japanese Patent Publication No. JP 6463335), a total error $V_{Out\_Total\_Error}$ of an error of the sensor output that occurs in the closed control loop of the secondary-side control circuit 3 due to an error signal that occurs from a circuit block included in the secondary-side control circuit 3, and an error of the sensor output that occurs in the closed control loop of the secondary-side control circuit 3 due to cross talk from the primary-side control circuit 2 to the secondary-side control circuit 3 is represented by the following Equation 3

$$V_{Out\_Total\_Error} = A \cdot \frac{1}{G_R^2(T)} + B \cdot \frac{1}{G_R(T)} + C \qquad \text{[Equation 3]}$$

where A, B, and C are constant values (coefficients) independent of temperature.

The analog correction of sensor output for the error $V_{Out\_Total\_Error}$ of the sensor output of the vibration-type angular rate sensor 100 represented by Equation 3 is now described in detail.

First, $V_{In\_Const\_Corr}$ (second offset value) based on the constant signal not dependent on temperature is added to the input (path 2) of the loop filter 34 of the secondary-side control circuit 3. In this case, the sensor output $V_{Out\_const\_Corr}$ of the vibration-type angular rate sensor 100 is represented by the following Equation 4. In the following Equation 4, $G_{SD}$ is a gain (Secondary Drive Amplifier Gain) of the drive circuit 36, and is independent of temperature. $G_{SR}(T)$ is a gain (Secondary resonator Gain) of the vibrator 1. $G_{SP}$ is a gain (Secondary Pick off Amplifier Gain) of the amplifier circuit 31 and is independent of temperature.

$$V_{Out\_const\_Corr} = \frac{V_{In\_Const\_Corr}}{G_{SD} \cdot G_{SR}(T) \cdot G_{SP}} = p \cdot \frac{1}{G_R(T)} \qquad \text{[Equation 4]}$$

When the second offset value based on the constant signal not dependent on temperature is added to the input of the loop filter 34, the sensor output $V_{Out\_const\_Corr}$ becomes a value inversely proportional to the gain $G_R(T)$ dependent on temperature, as shown in the aforementioned Equation 4. In the aforementioned Equation 4, p is a constant value. Then, $V_{In\_Const\_Corr}$ (second offset value) is adjusted by the addition-subtraction amount adjusting circuit 5a such that p in the aforementioned Equation 4 is equal in magnitude to B of $B/G_R(T)$, which is the second term in the aforementioned Equation 3, (p=−B), whereby $B/G_R(T)$, which is the second term in the aforementioned Equation 3, is canceled. More specifically, the second offset value based on the constant signal not dependent on temperature is adjusted and added to the input of the loop filter 34 so that the term inversely proportional to the first power of the gain $G_R(T)$ dependent on temperature in the aforementioned Equation 3 can be canceled.

The output $V_{AGC}$ of the loop filter 23 of the primary-side control circuit 2, which is dependent on temperature, is expressed by the following Equation 5. The output $V_{AGC}$ of the loop filter 23 is the output of the loop filter 23 obtained by taking into account the closed control loop, and becomes a value dependent on temperature.

$$V_{AGC} = D \cdot \frac{1}{G_R(T)} \qquad \text{[Equation 5]}$$

In the analog correction according to the first embodiment, in addition to $V_{In\_Const\_Corr}$ (second offset value) based on the constant signal not dependent on temperature, described above, a value (first offset value) obtained by multiply the output $V_{AGC}$ by a certain ratio q is added to the input (path 2) of the loop filter 34 of the secondary-side control circuit 3. When this first offset value is added, the sensor output $V_{Out\_AGC\_Corr}$ of the vibration-type angular rate sensor 100 is expressed by the following Equation (6).

$$V_{Out\_AGC\_Corr} = \qquad \text{[Equation 6]}$$
$$\frac{q \cdot V_{AGC}}{G_{SD} \cdot G_{SR}(T) \cdot G_{SP}} = \frac{q \cdot D}{G_{SD} \cdot G_{SP}} \cdot \frac{1}{G_R^2(T)} = r \cdot \frac{1}{G_R^2(T)}$$

When the first offset value based on the output of the primary-side control circuit 2 dependent on temperature is added to the input of the loop filter 34, the sensor output $V_{Out\_AGC\_Corr}$ becomes a value inversely proportional to the second power of the gain $G_R(T)$ dependent on temperature, as shown in the aforementioned Equation 6. In the aforementioned Equation 6, r is a constant value. Then, q is adjusted by the addition-subtraction amount adjusting circuit 4b such that r in the aforementioned Equation 6 is equal in magnitude to A of $A/G_R^2(T)$, which is a first term containing the second power of $G_R(T)$ in the aforementioned Equation 3, (r=−A), whereby $A/G_R^2(T)$, which is the first term in the aforementioned Equation 3, is canceled. More specifically, whereas the sensor output of the vibration-type angular rate sensor 100 becomes a value obtained by adding the error expressed by the aforementioned Equation 3 to the original sensor output when the sensor output is not corrected, according to the first embodiment, the first offset value and the second offset value are added so that the sensor output of the vibration-type angular rate sensor 100 becomes a value obtained by adding a constant value C to the original sensor output.

In the Equation 3, C is a constant value not dependent on temperature, and hence no problem occurs in the correction. The coefficients A, B, and C in the aforementioned Equation 3 are calculated by measuring (actually measuring) the sensor output of the vibration-type angular rate sensor 100 before correction (compensation) at each temperature and performing polynomial approximation on the measured data by a least-square method. The coefficients A, B, and C are calculated for each vibration-type angular rate sensor 100 (each product).

In this manner, the addition amount of the first offset value based on the output of the primary-side control circuit 2 dependent on temperature is adjusted such that $A/G_R^2(T)$, which is the first term in the Equation 3, (the term inversely proportional to the second power of the gain $G_R(T)$ dependent on temperature) is reduced to zero, and the addition amount of the second offset value based on the constant signal not dependent on temperature is adjusted such that $B/G_R(T)$, which is the second term in the Equation 3, (the term inversely proportional to the gain $G_R(T)$ dependent on temperature) is reduced to zero, whereby the sensor output is corrected in an analog manner.

Figure 2:
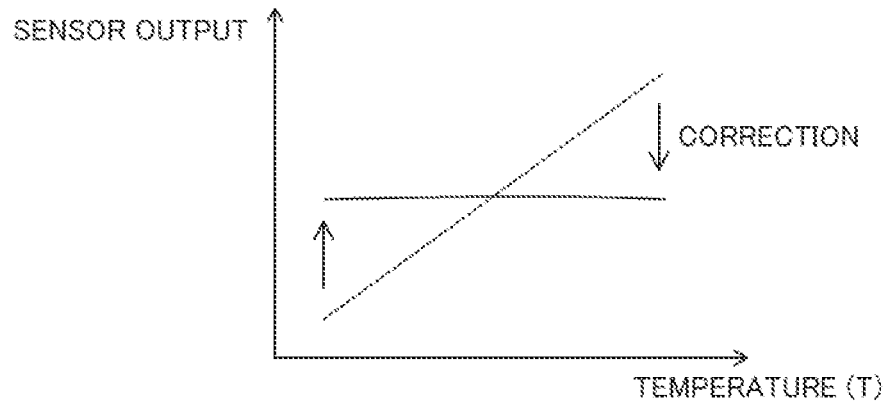
FIG. 2 is a graph illustrating correction of a sensor output based on a constant signal independent of temperature in the vibration-type angular rate sensor according to the first embodiment.
Figure 3:
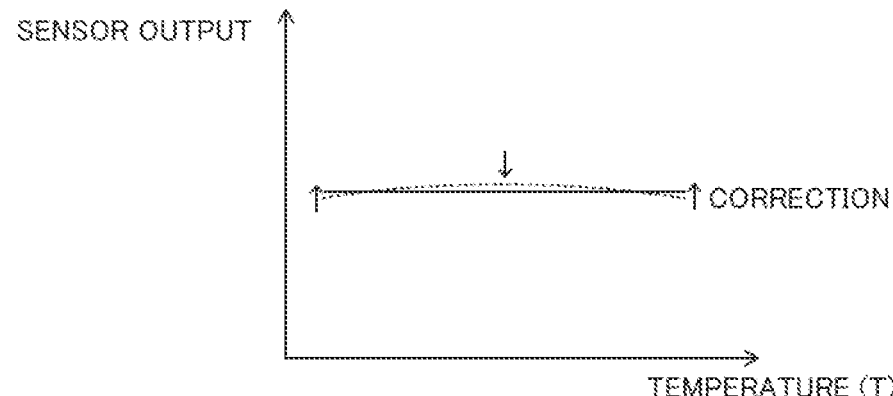
FIG. 3 is a graph illustrating correction of a sensor output based on an output of the primary-side control circuit dependent on temperature in the vibration-type angular rate sensor according to the first embodiment.

More specifically, as shown in FIG. 2, a component (the second term in the Equation 3) proportional to $1/G_R(T)$ of the error in the sensor output of the vibration-type angular rate sensor 100 (the term inversely proportional to the gain $G_R(T)$ dependent on temperature) is canceled by adding the second offset value based on the constant signal not dependent on temperature, whereby the sensor output (a dotted line in FIG. 2) having properties dependent on temperature becomes substantially constant (a solid line in FIG. 2). However, as shown in FIG. 3, even the sensor output that has been made substantially constant microscopically has properties (a dotted line in FIG. 3) dependent on temperature. Therefore, a component (the first term in the Equation 3) proportional to $1/G_R^2(T)$ of the sensor output of the vibration-type angular rate sensor 100 (the term inversely proportional to the second power of the gain $G_R(T)$ dependent on temperature) is also canceled by adding the first offset value based on the output of the primary-side control circuit 2 dependent on temperature, whereby the sensor output becomes non-dependent on temperature and substantially constant (a solid line in FIG. 3). Consequently, the accuracy of the correction can be increased. When the sensor output of the vibration-type angular rate sensor 100 is corrected in an analog manner, the signal is a continuous value so that the sensor output of the vibration-type angular rate sensor 100 can be restrained from changing in a step manner (the sensor output can be a continuous value), unlike the case where the sensor output is corrected in a digital manner (the signal is a discrete value).

(Configuration with Switching)

The following describes the offset values in the first embodiment in which the primary-side control circuit 2 does not switch between one set of electrodes 50 and another set of electrodes 50 as electrodes that induce the primary vibration in the vibrator 1, and the secondary-side control circuit 3 does not switch between the another set of electrodes and the one set of electrodes as electrodes that detect the secondary vibration in the vibrator 1.

As shown in FIG. 4, in the vibration-type angular rate sensor 100, a bias component (vertical axis) of angular velocity detected by the vibration-type angular rate sensor 100 generally varies in accordance with a change of temperature (horizontal axis). Also, variation of the bias component before the switching (P in FIG. 4) is different from variation the bias component after the switching (S in FIG. 4). A temperature variation of the sensor output (P in FIG. 5) can be reduced by adding the first and second offset values to cancel first and second terms of the aforementioned Equation 3 before the switching as shown in FIG. 5. Also, a temperature variation of the sensor output (S in FIG. 5) can be reduced by adding the first and second offset values to cancel first and second terms of the aforementioned Equation 3 after the switching. Because S and P in FIG. 5 are not symmetrical with respect to a line segment extending a horizontal axis (alternate long and short dashed lines in FIG. 5), a temperature variation component of difference between P and S in FIG. 5 is not zero. For this reason, if the first and second offset values are determined individually before and after the switching to cancel the first and second terms of the aforementioned Equation 3, the temperature variation component of difference between P and S in FIG. 5 is not zero.

To address this, the temporal first offset value a1 and the temporal second offset value a2 are determined before and after the switching to minimize the temperature variation component of difference between bias components before and after the switching with polarities of the offset values before and after the switching being inverted with respect to each other as shown in FIG. 6(a). If the temporal first offset value a1 and the temporal second offset value a2 are used before the switching, the first and second terms of the aforementioned Equation 3 are not canceled, and as a result the bias component has a gradient in accordance with temperature before the switching. Also, if the temporal first offset value-a1 and the temporal second offset value-a2 are used after the switching, the first and second terms of the aforementioned Equation 3 are not canceled, and as a result the bias component has a gradient in accordance with temperature after the switching.

Figure 7:
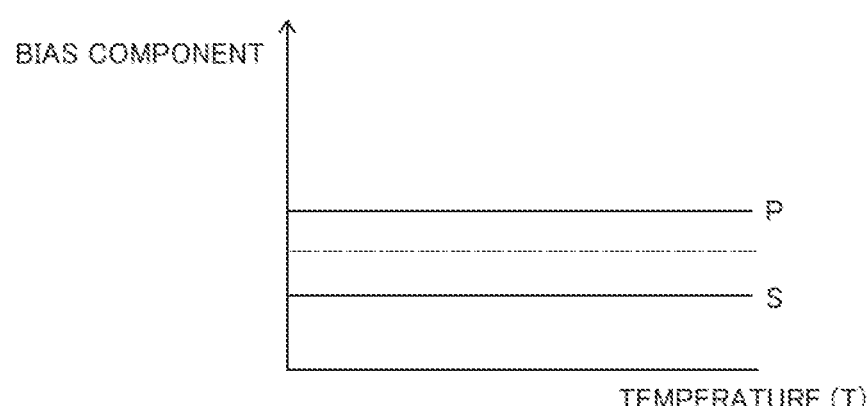
FIG. 7 is a graph (4) illustrating relationship between a temperature and a bias component after correction of the sensor output by using an offset value.

To address this, the temporal first offset value b1 and the temporal second offset value b2, which are offset with respect to a median (M in FIG. 4 between the variation of the bias component before the switching (P in FIG. 4) and the variation of the bias component after the switching (S in FIG. 4)), are determined to cancel the first and second terms of the aforementioned Equation 3 as shown in FIG. 6(b). The first offset value before the switching is a1+b1, the second offset value before the switching is a2+b2, the first offset value after the switching is −a1+b1, and the second offset value after the switching is −a2+b2. Accordingly, the first offset values before and after the switching become symmetrical with respect to the temporal first offset value b1, which is offset with respect to the median, and the second offset values before and after the switching become symmetrical with respect to the second offset value b2, which is offset with respect to the median. As a result, gradients of both variation of the bias component before the switching (P in FIG. 7) and variation the bias component after the switching (S in FIG. 7) can be reduced as shown in FIG. 7. Consequently, it is possible to reduce a temperature gradient of the bias component while reducing a difference between P and S (residual bias component) in FIG. 7.

Advantages of First Embodiment

In the first embodiment, the following advantages are obtained. The following is described assuming that a Q-value (a dimensionless number indicating a vibration state) generally has properties inversely proportional to temperature.

In the vibration-type angular rate sensor 100 according to the first embodiment, as described above, the primary-side control circuit 2 is configured to switch between one set of electrodes 50 and another set of electrodes 50 as electrodes that induce the primary vibration in the vibrator 1, the secondary-side control circuit 3 is configured to switch between the another set of electrodes and the one set of electrodes as electrodes that detect the secondary vibration in the vibrator, and the offset value after the switching and the offset value before the switching are symmetrical values with respect to a predetermined reference value. According to this configuration, because the offset values before and after the switching are symmetrical values with respect to a predetermined reference value, it is possible to prevent that symmetry of control of the vibration-type angular rate sensor 100 before and after the switching is broken. Consequently, it is possible to preventing increase of a temperature variation component of residual bias that cannot be completely canceled.

In the first embodiment, as described above, the secondary-side control circuit 3 includes a loop filter 34 in the closed control loop, and the sensor output is corrected by adding the offset value to an input of the loop filter 34. Here, the output of the closed control loop corresponds to an output of the loop filter. The output of the loop filter is inversely proportional to the gain (gain) of the temperature-dependent vibrator 1 due to the feedback operation of the closed control loop. In the first embodiment, from this viewpoint, an error caused by crosstalk that is inversely proportional to the first power and/or the second power of the gain of the vibrator 1, can be reduced by adding the offset value to the input of the loop filter 34.

In the first embodiment, as described above, the offset value after the switching is −a, which is a value whose polarity is inverted from the offset value before the switching a. Accordingly, because the offset values before and after the switching are symmetrical values with respect to zero before and after the primary-side control circuit 2 switch between one set of electrodes 50 and another set of electrodes 50 as electrodes that induce the primary vibration in the vibrator 1, and the secondary-side control circuit 3 can switch between the another set of electrodes and the one set of electrodes as electrodes that detect the secondary vibration in the vibrator 1, it is possible to prevent that symmetry of control of the vibration-type angular rate sensor 100 before and after the switching is broken.

In the first embodiment, as described above, the offset value before the switching is a+b, and the offset value after the switching is −a+b where a is a temporary offset before the switching, −a is a temporary offset value after the switching, and b is a temporary offset value that is offset with respect to a median between the sensor output before the switching and the sensor output after the switching.

Accordingly, because the offset values before and after the switching are symmetrical values with respect to b before and after the primary-side control circuit 2 switch between one set of electrodes 50 and another set of electrodes 50 as electrodes that induce the primary vibration in the vibrator 1, and the secondary-side control circuit 3 can switch between the another set of electrodes and the one set of electrodes as electrodes that detect the secondary vibration in the vibrator 1, it is possible to prevent that symmetry of control of the vibration-type angular rate sensor 100 before and after the switching is broken. Also, because the offset values before and after the switching are symmetrical with the offset value b with respect to the median between the sensor output before the switching and the sensor output after the switching, it is possible to prevent that symmetry of control of the vibration-type angular rate sensor 100 before and after the switching is broken while reducing a gradient of a residual bias component with respect to an environment temperature.

In the first embodiment, as described above, the sensor output is corrected, in a case of the analog correction of the sensor output, by adding, to the closed control loop of the secondary-side control circuit 3, a first offset value based on the output of the primary-side control circuit 2, which is inversely proportional to the temperature-dependent gain of the vibrator 1, for correction of the sensor output from the secondary-side control circuit 3 that is inversely proportional to a second power of the temperature-dependent gain of the vibrator 1, and a second offset value based on a constant signal that is independent of temperature for correction of the sensor output from the secondary-side control circuit 3 that is inversely proportional to the temperature-dependent gain of the vibrator 1, and by adjusting addition amounts of the first offset value and the second offset value. When the second offset value based on the constant signal not dependent on temperature is added to the closed control loop of the secondary-side control circuit 3, the output of the secondary-side control circuit 3 has properties inversely proportional to the gain of the vibrator 1 dependent on temperature. Similarly, the output of the primary-side control circuit 2 also has properties inversely proportional to the gain of the vibrator 1 by the feedback operation of the closed control loop, and hence the output of the secondary-side control circuit 3 has properties inversely proportional to the second power of the gain of the vibrator 1 by adding, to the closed control loop of the secondary-side control circuit 3, the first offset value based on the output of the primary-side control circuit 2 having the properties inversely proportional to the gain of the vibrator 1. In other words, because the sensor output is corrected, by adding, a first offset value corresponding to a second power of the gain of the vibrator and a second offset value corresponding to the gain of the vibrator, and by adjusting addition amounts of the first offset value and the second offset value, the sensor output can be subjected to correction that is inversely proportional to a first power of the gain of the vibrator and correction that is inversely proportional to a second power of the gain of the vibrator.

In the first embodiment, as described above, the analog correction is applied to the sensor output by adjusting the addition amount of the first offset value based on the output of the primary-side control circuit 2, which is dependent on temperature and is inversely proportional to the temperature-dependent gain of the vibrator 1, so as to reduce $A/G_R^2(T)$, and by adjusting the addition amount of the second offset value based on the constant signal that is independent of temperature so as to reduce $B/G_R(T)$; and $A/G_R^2(T)$ and $B/G_R(T)$ are first and second terms, respectively, of Equation 3 representing a total error $V_{Out\_Total\_Error}$ of an error of the sensor output that occurs in the closed control loop of the secondary-side control circuit 3 due to an error signal that occurs from a circuit block included in the secondary-side control circuit 3 and an error of the sensor output that occurs in the closed control loop of the secondary-side control circuit 3 due to cross talk from the primary-side control circuit 2 to the secondary-side control circuit 3. In the Equation 3, where $G_R(T)$ is the gain of the vibrator 1, which is dependent on temperature, and A, B, and C are constant values independent of temperature. According to this configuration, both the primary (the first power of the gain of the vibrator 1) component and the secondary (the second power of the gain of the vibrator 1) component of the error in the sensor output can be reduced, and hence the accuracy of the correction can be reliably increased. Although a constant value C remains, C is a constant value not dependent on temperature; hence the error in the sensor output caused by a temperature change is not influenced; and thus, no problem occurs in the correction.

In the first embodiment, as described above, the vibrator 1 includes a ring-type vibrator 1. The ring-type vibrator 1 has a symmetrical shape, and hence a vibration mode in the primary-side control circuit 2 and a vibration mode in the secondary-side control circuit 3 are similar to each other. Thus, when the present invention is applied to the vibration-type angular rate sensor 100 including the ring-type vibrator 1, it is not necessary to take into account the influence of a difference between the vibration modes, and hence the sensor output can be easily corrected.

In the first embodiment, as discussed above, the primary-side control circuit 2 is configured to switch between parts of the vibrator 1 as parts that induce the primary vibration by switching the switch 41 and the switch 42, and the secondary-side control circuit 3 is configured to switch between parts of the vibrator 1 as parts that detect the secondary vibration by switching the switch 43 and the switch 44. Accordingly, the switching of the switches 41 to 43 allows the primary-side control circuit 2 to easily switch between one set of electrodes 50 and another set of electrodes 50 as electrodes that induce the primary vibration in the vibrator 1, and the secondary-side control circuit 3 to easily switch between the another set of electrodes and the one set of electrodes as electrodes that detect the secondary vibration in the vibrator 1.

Second Embodiment

Figure 8:
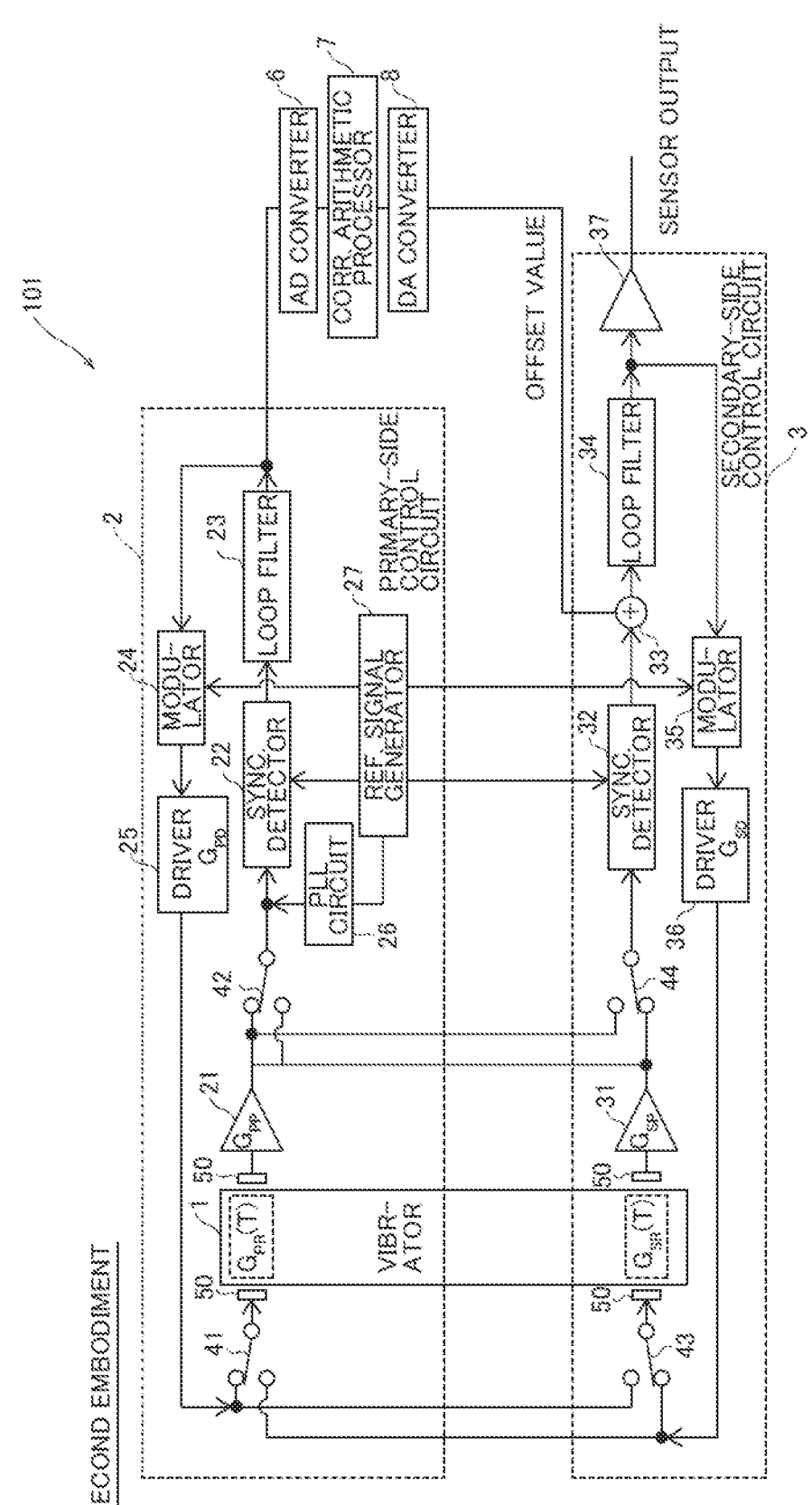
FIG. 8 is a block diagram showing a configuration of a vibration-type angular rate sensor according to a second embodiment.

The following description describes a configuration of a vibration-type angular rate sensor 101 according to a second embodiment with reference to FIG. 8. In the second embodiment, exemplary correction is described by digitally processing an output of the loop filter 23 of the primary-side control circuit 2.

As shown in FIG. 8, the vibration-type angular rate sensor 101 includes a vibrator 1, the primary-side control circuit 2, a secondary-side control circuit 3, an A-D conversion circuit 6, a correction arithmetic processing portion 7, and a D-A conversion circuit 8. Configurations of the vibrator 1, the primary-side control circuit 2 and the secondary-side control circuit 3 are similar to those of the first embodiment.

Similar to the aforementioned vibration-type angular rate sensor 101 according to the first embodiment, the primary-side control circuit 2 is configured to switch between one set of electrodes 50 and another set of electrodes 50 as electrodes that induce the primary vibration in the vibrator 1, and the secondary-side control circuit 3 is configured to switch between the another set of electrodes and the one set of electrodes as electrodes that detect the secondary vibration in the vibrator 1. Specifically, the primary-side control circuit 2 includes a switch 41 that is provided to the input side of a signal to the vibrator 1, and a switch 42 that is provided to the output side of the signal (output side of amplification circuit 21) from the vibrator 1. Also, the secondary-side control circuit 3 includes a switch 43 that is provided to the input side of a signal to the vibrator 1, and a switch 44 that is provided to the output side of the signal (output side of amplification circuit 31) from the vibrator 1.

The A-D conversion circuit 6 is configured to receive an analog signal dependent on temperature, output from the loop filter 23 of the primary-side control circuit 2, convert (quantize) the analog signal to a digital signal, and output the digital signal to the correction arithmetic processing portion 7. According to the second embodiment, the correction arithmetic processing portion 7 is configured to output, to the D-A conversion circuit 8, an offset value for reducing an error in a sensor output caused by a temperature change in accordance with the quantized output (an output from the A-D conversion circuit 6) of the primary-side control circuit 2. The D-A conversion circuit 8 is configured to convert the offset value into an analog signal and add the analog signal to the input of a loop filter 34 of the secondary-side control circuit 3. Thus, the vibration-type angular rate sensor 101 is configured to correct the sensor output.

The following description describes digital correction of a sensor output with reference to FIGS. 8 and 9.

Firstly, by measuring the sensor output of the vibration-type angular rate sensor 101 while sweeping (changing to various values) offset values (correction values) input to the adder circuit 33 of the secondary-side control circuit 3, offset values (y1, y2, . . . , see FIG. 9) corresponding to temperatures (T1, T2, . . . , see FIG. 9) are searched before and after the switching to minimize the residual temperature variation component of bias (difference between bias components before and after the switching) with polarities of the offset values before and after the switching being inverted similar to the aforementioned first embodiment. In addition, offset values (z1, z2, . . . , see FIG. 9), which are offset with respect to a median between bias components before and after the switching, corresponding to temperatures (T1, T2, . . . , see FIG. 9) are searched to reduce an error in the sensor output of the vibration-type angular rate sensor 101 (an error corresponding to the error defined by the aforementioned Equation 3) to zero or substantially zero.

Subsequently, the following Equation 7 (l, m, and n are coefficients of constant values) is acquired (calculated) as y, which is an offset value that minimizes the residual temperature variation component of bias (difference between bias components before and after the switching), by performing polynomial approximation on data shown in FIG. 9 by a least-square method, where x is an output from the primary-side control circuit 2 (loop filter 23) quantized corresponding to each temperature. In the second embodiment, a second-order polynomial is used as shown in the Equation 7.

Also, the following Equation 8 is acquired as an offset value of the bias component before and the after switching, where x is the output from the primary-side control circuit 2 (loop filter 23) quantized corresponding to each temperature.

As a result, relational equations (the aforementioned Equations 7 and 8) between the offset values corresponding to each temperature and the outputs of the primary-side control circuit 2 quantized corresponding to temperatures are previously acquired (before the vibration-type angular rate sensor 101 is actually used). The relational equations are calculated for each vibration-type angular rate sensor 101 (each product). When the vibration-type angular rate sensor 101 is actually used, in the vibration-type angular rate sensor 101, correction is applied to a sensor output by calculating the offset values (y+z before the switching, −y+z after the switching) by substituting a quantized output (x) of the primary-side control circuit 2 in the aforementioned Equations 7 and 8 by executing software in the correction arithmetic processing portion 7, and then by adding the offset values acquired to the secondary-side control circuit 3. In other words, when digital correction is applied to the sensor output, the relational equations (the aforementioned Equations 7 and 8) are constantly executed, and the sensor output is constantly corrected in accordance with the quantized output of the primary-side control circuit 2.

In the second embodiment, the following advantages are obtained.

In the second embodiment, the sensor output is corrected, in a case of digital correction of the sensor output, by quantizing the output of the primary-side control circuit 2, which is dependent on temperature and is inversely proportional to a temperature-dependent gain of the vibrator 1, and by adding, to the secondary-side control circuit 3, the offset value for reducing an error in the sensor output caused by a temperature change in accordance with the quantized output of the primary-side control circuit 2. According to this configuration, the sensor output can be corrected simply by adding, to the secondary-side control circuit 3, the offset value for reducing the error in the sensor output caused by a temperature change to zero or substantially zero, and hence the configuration of the vibration-type angular rate sensor 101 can be simplified, unlike the case where an offset value other than the offset value based on the output of the primary-side control circuit 2 dependent on temperature is added.

Note that the embodiment disclosed this time must be considered as illustrative in all points and not restrictive. The scope of the present invention is not shown by the above description of the embodiments but by the scope of claims for patent, and all modifications within the meaning and scope equivalent to the scope of claims for patent are further included.

While the example in which the ring-type vibrator is used has been shown in the aforementioned first and second embodiments, the present invention is not limited to this. For example, a disk-shaped, cup-shaped (wineglass-shaped), or octagon-shaped vibrator may be used so far as the vibrator has a symmetrical shape.

While the example in which the closed control loop includes the vibrator, the amplifier circuit, the synchronous detection circuit, the loop filter, the modulation circuit, and the drive circuit has been shown in each of the aforementioned first and second embodiments, the present invention is not restricted to this. For example, the control loop may include a structure other than the structure including the amplifier circuit, the synchronous detection circuit, the loop filter, the modulation circuit, and the drive circuit.

While the example in which the integral filter is used as the loop filter has been shown in each of the aforementioned first and second embodiments, a loop filter other than the integral filter may be used, for example.

While the example in which the first offset value before the switching is a1+b1, the second offset value before the switching is a2+b2, the first offset value after the switching is −a1+b1, and the second offset value after the switching is −a2+b2 has been shown in the aforementioned first embodiment, the present invention is not limited to this. For example, alternatively, the first offset value before the switching can be a1, the second offset value before the switching can be a2, the first offset value after the switching can be −a1 whose polarity is inverted from the offset value before the switching a1, and the second offset value after the switching can be −a2 whose polarity is inverted from the offset value after the switching a2. Although a certain amount of residual temperature variation component of bias remains before and after the primary-side control circuit 2 switch between one set of electrodes 50 and another set of electrodes 50 as electrodes that induce the primary vibration in the vibrator 1, and the secondary-side control circuit 3 can switch between the another set of electrodes and the one set of electrodes as electrodes that detect the secondary vibration in the vibrator 1, the first offset value for correction that is inversely proportional to a second power of a gain of the vibrator 1, and the second offset value for correction that is inversely proportional to a first power of the gain of the vibrator 1 are symmetrical with respect to zero (predetermined reference value), and as a result it is possible to prevent that symmetry of control of the vibration-type angular rate sensor before and after the switching is broken.

While the example in which the first offset value before the switching is a1+b1, the second offset value before the switching is a2+b2, the first offset value after the switching is −a1+b1, and the second offset value after the switching is −a2+b2 has been shown in the aforementioned first embodiment, the present invention is not limited to this. For example, alternatively, a median can be determined to cancel the first term in the aforementioned Equation 3 (in other words, the first offset value is fixed b1), the second offset value before the switching can be a2+b2, and the second offset value after the switching can be −a2+b2. That is, only the second offset values before and after the switching can be symmetrical with respect to a predetermined reference value.

While the example in which the temporal first offset value a1 and the temporal second offset value a2 are determined before and after the switching to minimize residual bias components before and after the switching has been shown in the aforementioned first and second embodiments, the present invention is not limited to this. For example, alternatively, the first and second offset values before and after the switching can be determined to reduce residual bias components to values close to the minimized residual bias component values before and after the switching.

While the example in which the addition-subtraction amount adjusting circuits 4a and 4b, and the addition-subtraction amount adjusting circuits 5a and 5b (four separate circuits) are provided to output the offset value a+b and the offset value −a+b has been shown in the aforementioned first embodiment, the present invention is not limited to this. In the present invention, alternatively, any circuit can be provided as long as it can output signals corresponding to the offset value of a+b and the offset value of −a+b.

DESCRIPTION OF REFERENCE NUMERALS

1; vibrator
2; primary-side control circuit
3; secondary-side control circuit
34; loop filter
41; switch (first switch)
42; switch (second switch)
43; switch (third switch)
44; switch (fourth switch)
50; electrode
100, 101; vibration-type angular rate sensor

The invention claimed is:

1. A vibration-type angular rate sensor comprising:
a vibrator;
a primary-side control circuit including a closed control loop and configured to induce a primary vibration in the vibrator by using an output of the closed control loop; and
a secondary-side control circuit including a closed control loop that is configured to detect a secondary vibration generated in the vibrator due to an angular velocity applied to the vibrator, and configured to correct a sensor output by adding an offset value to the closed control loop, wherein
the primary-side control circuit is configured to switch between one set of electrodes and another set of electrodes as electrodes that induce the primary vibration in the vibrator,
the secondary-side control circuit is configured to switch between the another set of electrodes and the one set of electrodes as electrodes that detect the secondary vibration in the vibrator, and
the offset value after the switching and the offset value before the switching are symmetrical values with respect to a predetermined reference value.

2. The vibration-type angular rate sensor according to claim 1, wherein the secondary-side control circuit includes a loop filter in the closed control loop; and the sensor output is corrected by adding the offset value to an input of the loop filter.

3. The vibration-type angular rate sensor according to claim 1, wherein the offset value after the switching is −a, which is a value whose polarity is inverted from the offset value before the switching a.

4. The vibration-type angular rate sensor according to claim 1, wherein a is a temporary offset value before the switching, −a is a temporary offset value after the switching, and b is a temporary offset value that is offset with respect to a median between the sensor output before the switching and the sensor output after the switching, the offset value before the switching is a+b, and the offset value after the switching is −a+b.

5. The vibration-type angular rate sensor according to claim 1, wherein the sensor output is corrected, in a case of analog correction of the sensor output, by adding, to the closed control loop of the secondary-side control circuit, a first offset value based on the output of the primary-side control circuit that is inversely proportional to a temperature-dependent gain of the vibrator for correction of the sensor output that is inversely proportional to a second power of the temperature-dependent gain of the vibrator from the secondary-side control circuit, and a second offset value based on a constant signal that is independent of temperature for correction of the sensor output that is inversely proportional to the temperature-dependent gain of the vibrator from the secondary-side control circuit, and by adjusting addition amounts of the first offset value and the second offset value.

6. The vibration-type angular rate sensor according to claim 5, wherein the analog correction is applied to the sensor output by adjusting the addition amount of the first offset value based on the output of the primary-side control circuit, which is dependent on temperature and is inversely proportional to the temperature-dependent gain of the vibrator, so as to reduce $A/G_R^2(T)$, and by adjusting the addition amount of the second offset value based on the constant signal that is independent of temperature so as to reduce $B/G_R(T)$; and $A/GR^2(T)$ and $B/G_R(T)$ are first and second terms, respectively, of the following equation representing a total error $V_{Out\_Total\_Error}$ of an error of the sensor output that occurs in the closed control loop of the secondary-side control circuit due to an error signal that occurs from a circuit block included in the secondary-side control circuit and an error of the sensor output that occurs in the closed control loop of the secondary-side control circuit due to cross talk from the primary-side control circuit to the secondary-side control circuit $$V_{Out\_Total\_Error} = A \cdot \frac{1}{G_R^2(T)} + B \cdot \frac{1}{G_R(T)} + C \qquad \text{[Equation 1]}$$

where $G_R(T)$ is the gain of the vibrator, which is dependent on temperature of the vibrator, and A, B, and C are constant values independent of temperature.

7. The vibration-type angular rate sensor according to claim 1, wherein the sensor output is corrected, in a case of digital correction of the sensor output, by quantizing the output of the primary-side control circuit, which is dependent on temperature and is inversely proportional to a temperature-dependent gain of the vibrator, and by adding, to the secondary-side control circuit, the offset value for reducing an error in the sensor output caused by a temperature change in accordance with the quantized output of the primary-side control circuit.

8. The vibration-type angular rate sensor according to claim 1, wherein the vibrator includes a ring-shaped vibrator.

9. The vibration-type angular rate sensor according to claim 1, wherein the primary-side control circuit includes a first switch provided to an input side of a signal to the vibrator, and a second switch provided to an output side of a signal from the vibrator;

the secondary-side control circuit includes a third switch provided to the input side of a signal to the vibrator, and a fourth switch provided to the output side of the signal from the vibrator;

the primary-side control circuit is configured to switch between the one set of electrodes and the another set of electrodes as the electrodes that induce the primary vibration in the vibrator by switching the first switch and the second switch; and the secondary-side control circuit is configured to switch between the another set of electrodes and the one set of electrodes as the electrodes that detect the secondary vibration in the vibrator by switching the third switch and the fourth switch.

\* \* \* \* \*